United States Patent [19]
Fowler

[11] 3,906,363
[45] Sept. 16, 1975

[54] CIRCUIT BOARD CONTINUITY TESTING DEVICE

[76] Inventor: Richard O. Fowler, 4820 S.W. Menlo, Beaverton, Oreg. 97005

[22] Filed: Sept. 9, 1974

[21] Appl. No.: 504,506

[52] U.S. Cl............... 324/158 F; 324/51; 324/72.5; 324/73 PC
[51] Int. Cl.² ...................... G01R 1/06; G01R 31/02
[58] Field of Search... 324/158 F, 158 P, 51, 73 PC, 324/73 R, 72.5

[56] References Cited
UNITED STATES PATENTS

| | | | |
|---|---|---|---|
| 3,562,643 | 2/1971 | Smith.............................. | 324/72.5 |
| 3,805,159 | 4/1974 | Richelmann..................... | 324/158 F |

*Primary Examiner*—Alfred E. Smith
*Assistant Examiner*—Ernest F. Karlsen
*Attorney, Agent, or Firm*—James D. Givnan, Jr.

[57] ABSTRACT

A test device including a base mounting a multitude of spring wire fingers each extending upwardly through an offset opening formed in a reciprocally mounted biasing plate. Closing movement between biasing plate and base urges the spring finger ends into forceful wiping contact with terminals formed in a perforate printed circuit board being tested. Each of said fingers is in circuit with additional test equipment which verifies the circuit continuity of the board. Means carried by said base limits circuit board travel during a test sequence.

7 Claims, 5 Drawing Figures

3,906,363

PATENTED SEP 16 1975

CIRCUIT BOARD CONTINUITY TESTING DEVICE

BACKGROUND OF THE INVENTION

The present device constitutes a test fixture for checking the continuity of circuits of a printed circuit board during its course of manufacture. The device is usable in conjunction with a comparison instrument such as a computer to verify the circuitry of each circuit board.

With the advent of printed circuit boards a problem has arisen in accomplishing rapid and efficient circuit board testing by reason of the high density of terminals within a small area. Manually checking the terminals with attached electrical leads is a laborious, time-consuming operation and incurs the risk of certain terminal checks being overlooked.

Printed circuit boards tested by the present device are of the perforate type are characterized by a grid-like appearance with some of the perforations constituting terminals according to specific circuit board design. The circuit board testing devices known are of an extremely complicated nature, costly to manufacture and do not accomplish positive terminal contact during circuit board testing.

SUMMARY OF THE INVENTION

The instant invention is embodied within a device having a multitude of wire spring finger contacts for inserted contact within the perforations of a circuit board, such perforations constituting electrical terminals of the board.

The spring fingers are secured to a supporting surface with each finger extending upwardly, somewhat inclined, through a biasing plate having offset openings therein. Downward movement of the plate causes the plate to exert a lateral biasing action against each spring finger within a plate opening thereby urging the uppermost end of each finger into lateral engagement with an opening in the circuit board to affect positive contact therewith. Guide means assure travel of the biasing plate in spaced parallel relationship with a subjacent plate mounting the spring fingers. Said biasing plate initially receives the circuit board while circuit board supports, disposed below said biasing plate, receive and support the circuit board during downward displacement of the biasing plate in a test operation. Located adjacent one side of the circuit board being tested are lateral limit stops against which the circuit board abuts in response to spring finger action.

Important objectives of the invention include: a highly reliable circuit board test device operable to accomplish simultaneous electrical contact with every terminal on the board thereby enabling comparison of the circuit board with a desired read out on a computer or other comparative means; the provision of a testing device wherein each spring finger is laterally or axially displaced during a test operation into wiping, positive engagement with the inner periphery of a circuit board terminal perforation thereby overcoming the well-known problem of accomplishing positive, sure contact with such terminals during a momentary test of the circuit board; and the provision of a circuit board test device of low cost manufacture.

DETAILED DESCRIPTION OF THE PREFERRED EMBODIMENT

Figure 1:
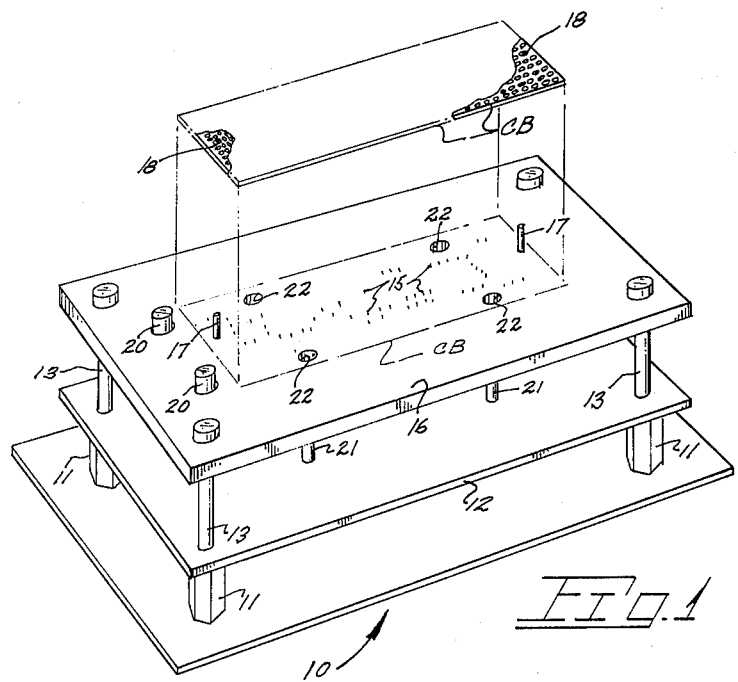
FIG. 1 is a perspective view of the present test device with a circuit board shown elevated therefrom.

With continuing reference to the accompanying drawings wherein applied reference numerals indicate parts similarly identified in the following specification, the reference numeral 10 indicates generally a base on which are mounted the following described components.

Base 10 includes spacers 11 supporting a spring finger mounting plate 12 of dielectric material. Plate 12 of the base is held stationary by means of guides 13 shouldered at 13A and in threaded engagement with spacers 11. Finger mounting plate 12 mounts a multitude of metal sockets 14 each of which serves to secure the lower end segment of a metallic spring finger 15 which may be of stainless steel spring wire.

Figure 4:
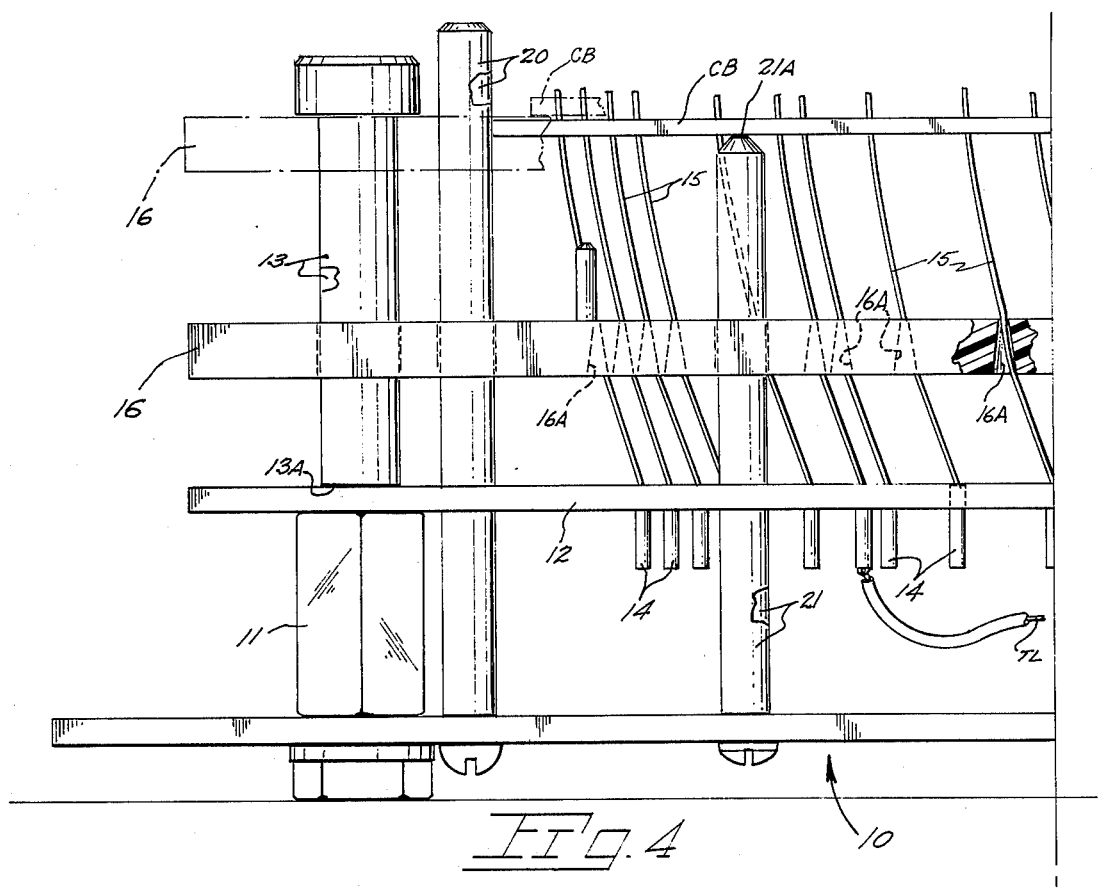
FIG. 4 is an enlarged fragmentary front elevational view of the device broken away along a transverse centerline showing a circuit board in place thereon undergoing testing.
Figure 5:
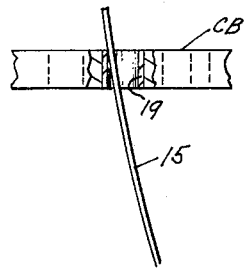
FIG. 5 is a fragmentary elevational view of a circuit board with fragments broken away to disclose spring finger-terminal engagement.

Slidably carried by guides 13 is a finger biasing plate 16, also of dielectric material, defining openings therein at 16A (FIG. 4) through which pass individual spring fingers 15. Openings 16A are of a conical shape terminating upwardly in an opening only slightly larger than the diameter of the spring finger therein. Further, each opening 16A is laterally offset from a socket 14 within which is secured the spring finger extending in a somewhat inclined manner through said opening. Accordingly, downward movement of biasing plate 16 to the broken line positioned in FIG. 2 (full line position of FIG. 4) results in each spring finger being biased laterally and particularly the upper end of same into wiping contact with the terminal opening formed in the printed circuit board indicated at CB. Locating pins 17 are integral with finger biasing plate 16 to assure precise placement of the circuit board on said plate with the circuit board being provided with openings 18 for pin registration. The term "printed" comprehends all circuit boards of a perforate nature wherein terminals define openings in the board.

Mounted on base 10 are circuit board stops disclosed as pins 21 terminating upwardly in a recessed manner within openings 22 formed within biasing plate 16. In the uppermost position of plate 16, a circuit board in place thereon is spaced slightly upwardly from the uppermost ends 21A of stop pins 21. The pin ends 21A are rounded and during a circuit board test receive the board as plate 16 is depressed. Subsequent lateral movement of the board thereover occurs in response to the action of spring fingers 15.

Also mounted on base 10 are limit means in the form of a pair of posts 20 disposed adjacent one end of the circuit board which posts serve to limit lateral, finger urged movement of the circuit board during a test sequence.

Figure 2:
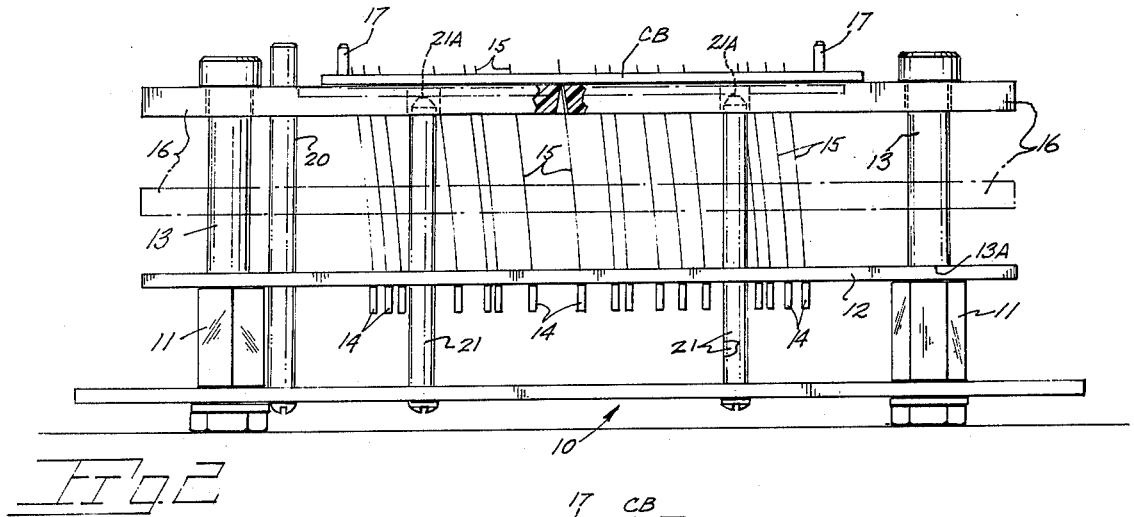
FIG. 2 is a front elevational view of the testing device shown in FIG. 1.
Figure 3:
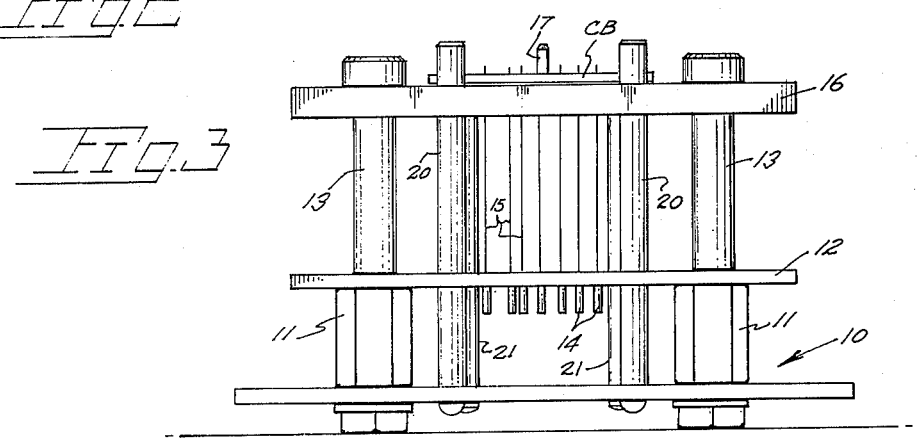
FIG. 3 is an end elevational view of the left hand end of FIG. 2.

In a test sequence checking a circuit board for circuit integrity the board is placed on plate 16 with board openings 18 in registration with board locating pins 17. As seen in FIG. 2 the uppermost end segments of wire fingers 15 will partially occupy those openings in the circuit board plate constituting circuit board terminals. Obviously the arrangements of fingers 15 and sockets 14 on plate 12 will vary with the run of circuit boards being tested. Depressing of plate 16 by the operator will cause further penetration of the finger end segments upwardly through the board terminal openings until same extend approximately one-eighth of an inch above the circuit board with downward travel of the circuit board being stopped by board deposit on ends 21A of pins 21. Continued downward travel of plate 16 (with the circuit board on pin ends 21A) results in the plate 16 exerting a lateral biasing force to the left, as viewed in FIGS. 2 and 4, causing the circuit board to shift in a like direction until the board end engages the sides of posts 20. Continued downward biasing of plate 16 further displaces the finger axes to the left causing the upper ends of the fingers to further forcefully engage the terminal peripheral wall at 19 with a wiping action to make positive contact with the plated opening in the board constituting a terminal.

For utilizing the test device for testing other printed circuit boards, the finger mounting plate 12 would be removed as would biasing plate 16, each being replaced by a mounting plate and biasing plate having, respectively, a different finger arrangement and different finger receiving openings. Guides 13 are in threaded engagement with spacers 11 for this purpose.

A typical test lead at TL connects the lower end of each spring finger 15 to supplementary test equipment such as a computer having acceptable circuit continuity in its memory for purposes of comparison.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. A device for testing circuit board continuity, said device comprising in combination,
a base including a plate, metallic spring contact fingers mounted on said plate and projecting upwardly therefrom, each of said spring fingers in circuit with supplemental test equipment, upright guides on said base,
a finger biasing plate mounted on said upright guides and adapted for reciprocal motion therealong, said biasing plate defining openings therein each having a spring finger therewithin, said biasing plate openings offset to one side from the plate mounted portions of their respective spring fingers so as to cause displacement of each finger during closing movement of said biasing plate towards said base,
said biasing plate adapted to temporarily receive a superimposed perforate circuit board to be tested with certain of said perforations constituting board terminals, said certain of the terminal perforations receiving the upper segment of a spring contact finger upon the circuit board being superimposed on said plate,
means subjacent the circuit board to limit downward travel of same during closing movement of the biasing plate and base, and
said upper segments of the fingers being displaced into positive engagement with their respective terminal perforations in the circuit board during closing movement between said base and said biasing plate.

2. The testing device as claimed in claim 1 additionally including limit stop means horizontally offset from one edge of the circuit board to limit displacement of the circuit board by the fingers during testing.

3. The testing device as claimed in claim 1 wherein the finger receiving openings defined by the biasing plate are of a non-constant diameter.

4. The testing device as claimed in claim 3 wherein each of said openings defined by said biasing plate is of conical shape terminating at its upper end in a dimension corresponding to the sectional dimension of the spring finger.

5. The testing device as claimed in claim 1 wherein said biasing plate includes registering means assuring precise placement of the circuit board on the biasing plate thereby assuring spring finger and terminal registration.

6. The testing device as claimed in claim 1 wherein each of the metallic spring fingers are mounted at their lowermost ends in sockets carried by the base structure.

7. The testing device as claimed in claim 1 wherein said upright guides are detachably mounted on said base, said biasing plate and said spring contact finger mounting plate being removable from said base upon guide removal permitting substitution of a second biasing plate and spring contact finger mounting plate permitting testing of other circuit boards having different terminal disposition.

* * * * *